United States Patent Office 3,637,780
Patented Jan. 25, 1972

3,637,780
PROCESS FOR THE PRODUCTION OF ARYL-PHENYLMETHYLCHLOROSILANES
Andre Bazouin, Luzinay, and Marcel Lefort, Caluire, France, assignors to Rhone-Poulenc S.A., Paris, France
No Drawing. Filed Mar. 24, 1970, Ser. No. 22,374
Claims priority, application France, Mar. 26, 1969, 6908928
Int. Cl. C07f 7/12
U.S. Cl. 260—448.2 P     7 Claims

ABSTRACT OF THE DISCLOSURE

Phenylarylmethylchlorosilanes (in which the aryl group is phenyl or $C_1$–$C_6$ alkylphenyl) are made by reaction of the corresponding aryldimethylchlorosilane with phenylmethyldichlorosilane in the liquid phase in the presence of aluminium chloride and at a temperature of 10–100° C., with the formation as by-product of dimethyldichlorosilane which is removed as vapour as it is formed.

---

This invention relates to a process for the preparation of phenylarylmethylchlorosilanes by a redistribution reaction between an aryldimethylchlorosilane and phenylmethyldichlorosilane.

The phenylarylmethylchlorosilanes have hitherto been synthesised by methods using magnesium compounds, and no way of making them by a redistribution reaction has been known. However, the redistribution reactions between organochlorosilanes are of great industrial value because they make it possible to convert, at little cost, an organochlorosilane of little practical value into another organochlorosilane which is more valuable from the point of view of its technical applications. Thus dimethylphenylchlorosilane has been made from trimethylchlorosilane and diphenyldichlorosilane by such a reaction (J. Rathousky and colleagues, Collection Czechoslov. Chem. Comm. 25, 1807 (1960)) carried out in the vapour phase at about 500° C. over a catalyst consisting of a complex of aluminium chloride and sodium chloride, though with a low yield.

According to the present invention, arylphenylmethylchlorosilanes are made by reacting an aryldimethylchlorosilane in the liquid phase with phenylmethyldichlorosilane in the presence of aluminium chloride, and removing the dimethyldichlorosilane in the vapour state as it is formed.

The reaction can be represented as follows:

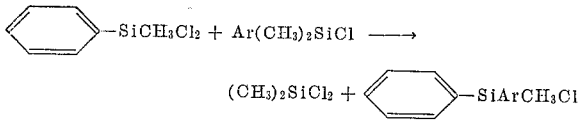

In the above formulae, the symbol Ar represents a phenyl radical or an alkylphenyl radical in which the substituent branched or unbranched alkyl groups contain 1 to 6 carbon atoms.

The reagents can be used in any proportions but in general, substantially equimolar proportions are preferred.

The aluminium chloride can be used in an amount by weight ranging from 0.1 to 10% and preferably from 0.5% to 5%, on the total weight of the chlorosilanes employed. Preferably, anhydrous aluminium chloride which has been stored in the form of coarse blocks and finely ground just before use is employed.

The reaction is carried out in the liquid phase at a temperature between 10° and 100° C. and preferably between 20° and 60° C., maintaining throughout a pressure less than the saturated vapour pressure of dimethyldichlorosilane at the prevailing temperature. Thus it is possible either to work under atmospheric pressure if the temperature is above 70° C., or under reduced pressure if the temperature is below 70° C. In general, the process is carried out under a pressure of 10 to 100 mm. of mercury.

When the evolution of dimethyldichlorosilane has ceased, the constituents of the reaction mixture can be separated by any known method, for example, by fractional distillation. In order to avoid aluminium chloride being carried over into the distillates and the occurrence of subsequent side-reactions, it is advantageous to convert the catalyst in the final mixture into a complex which is insoluble in the reaction mixture without changing the amounts of the other constituents of the composition. This can be done for example by adding a ketone, such as acetone, e.g. at a temperature of 20° to 25° C., or by adding an alkali metal halide such as sodium chloride and heating the mixture briefly. The arylphenylmethylchlorosilane can thereafter be separated by conventional means, for example by distillation.

The arylphenylmethylchlorosilanes are compounds which are extensively used in the industry of organosilicon compounds, in particular for the preparation of organopolysiloxane resins, to which the aromatic radicals impart better resistance to heat stresses and greater thermoplasticity. The present process possesses the advantage that the dimethyldichlorosilane formed as a by-product is itself useful as the basic starting material for the preparation of dimethylpolysiloxane fluids and elastomers.

The following examples illustrate the invention.

EXAMPLE 1

The following reagents are introduced into a 2 litre flask provided with a stirrer and connected to two traps cooled to —80° C.:

|  | G. |
|---|---|
| Methylphenyldichlorosilane | 671 |
| Dimethylphenylchlorosilane | 617 |
| Aluminium chloride | 13.5 |

The temperature is kept at 25–30° C. while a pressure of 17 mm. of mercury is established downstream from the traps. A gas is evolved and condenses in the traps. After 13½ hours the evolution of gas ceases; the traps and the flask are then blanketed with dry nitrogen at atmospheric pressure, 9 g. of acetone are added and the mixture is stirred for 30 minutes. The aluminium chloride forms a complex which is filtered off, and 295 g. of a fraction of boiling point at 14 mm. of 86–89° C. is isolated by distillation; this consists largely of methylphenyldichlorosilane and dimethylphenylchlorosilane. Thereafter 549 g. of a fraction of boiling point at 0.6 mm. of 106–108° C. is collected. This contains 97.4% of diphenylmethylchlorosilane (by chromatographic determination). Taking into account the reagents recovered, the degrees of conversion of the methylphenyldichlorosilane and of the dimethylphenylchlorosilane are respectively 75.2% and 76.5%. The yields of diphenylmethylchlorosilane are respectively 87% on the methylphenyldichlorosilane converted and 83.6% on the dimethylphenylchlorosilane converted.

EXAMPLE 2

The following are introduced into a 250 cm.³ flask provided with a stirrer and connected to two straps cooled to —80° C.:

|  | G. |
|---|---|
| p-Tolyldimethylchlorosilane | 74 |
| Phenylmethyldichlorosilane | 76.5 |
| Aluminium chloride | 3 |

When the reagents have been heated to 50° C., a pressure of 15 mm. of mercury is established downstream from the traps. After 11 hours, the evolution of dimethyldichlorosilane ceases. An atmosphere of dry nitrogen under atmospheric pressure is then established in the reaction flask and the traps, 2 g. of acetone are added, and stirring is continued for 30 minutes. The aluminium chloride complex formed is filtered off, and distillation successively yields a first fraction of 66 g. of boiling point (32 mm.) of 106–114° C., consisting essentially of methylphenyldichlorosilane and p-tolydimethylchlorosilane, followed by a second fraction of 48 g. of boiling point (0.1 mm.) of 19–123° C., containing 42.5% of p-tolyphenylmethyldichlorosilane. The degrees of conversion of the methylphenyldichlorosilane and of the p-tolydimethylchlorosilane are respectively 64.5% and 63.2%. The yield of p-tolyphenylmethylchlorosilane is about 32%, on each of the reagents converted.

We claim:

1. Process for the preparation of a phenylarylmethylchlorosilane of general formula:

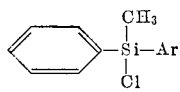

in which Ar represents a phenyl group or an alkyl phenyl group in which the alkyl groups contain 1 to 6 carbon atoms, which comprises reacting the corresponding aryldimethylchlorosilane with phenylmethyldichlorosilane in the liquid phase at a temperature between 10 to 100° C. and in the presence of aluminium chloride, and removing dimethyldichlorosilane in the vapour state as it is formed.

2. Process according to claim 1, in which the aluminium chloride is present in amount 0.1 to 10% of the total weight of the chlorosilane reactants.

3. Process according to claim 1 in which the aluminium chloride is employed in a freshly ground state.

4. Process according to claim 1 in which the reaction is carried out at 20–60° C. under a pressure of 10–100 mm. of mercury.

5. Process according to claim 1 in which after the evolution of dimethyldichlorosilane has substantially ended, the aluminium chloride in the reaction mixture is converted into a complex which is substantially insoluble in the reaction mixture, and this complex is filtered off, after which the arylphenylmethylchlorosilane is separated by distillation.

6. Process according to claim 1, in which the aluminium chloride is employed in a freshly ground state in amount 0.5–5% of the total weight of the chlorosilane reactants, and the reaction is carried out at 20–60 C. under a pressure of 10–100 mm. of mercury.

7. Process according to claim 6, in which after the evolution of dimethyldichlorosilane has substantially ended, the aluminium chloride in the reaction mixture is converted into a complex which is substantially insoluble in the reaction mixture, and this complex is filtered of, after which the arylphenylmethylchlorosilane is separated by distillation.

References Cited

UNITED STATES PATENTS

| 2,746,981 | 5/1956 | Wagner et al. | 260—448.2 P |
| 2,786,861 | 3/1957 | McEntee | 260—448.2 P |

FOREIGN PATENTS

| 557,130 | 5/1958 | Canada | 260—448.2 P |
| 663,690 | 12/1951 | Great Britain | 260—448.2 P |
| 850,335 | 10/1960 | Great Britain | 260—448.2 P |

TOBIAS E. LEVOW, Primary Examiner

P. F. SHAVER, Assistant Examiner

U.S. Cl. X.R.

260—448.2 E